United States Patent [19]
Lindner et al.

[11] Patent Number: 5,082,379
[45] Date of Patent: Jan. 21, 1992

[54] ELECTRICAL OVERHEAD CABLE ROPE COMPRISING AN INTEGRATED OPTICAL COMMUNICATION LEAD

[75] Inventors: Helmut Lindner, Cologne; Norbert Wenzel, Bergisch-Galdbach; Robert Herff, Cologne; Hans-Joachim Schmitz, Kerpen, all of Fed. Rep. of Germany

[73] Assignee: U.S. Philips Corp., New York, N.Y.

[21] Appl. No.: 638,277

[22] Filed: Jan. 2, 1991

[30] Foreign Application Priority Data

Jan. 11, 1990 [DE] Fed. Rep. of Germany ....... 4000605

[51] Int. Cl.⁵ .............................. G02B 6/44
[52] U.S. Cl. .............................. 385/101; 385/113
[58] Field of Search .............................. 350/96.23

[56] References Cited

U.S. PATENT DOCUMENTS

| | | | |
|---|---|---|---|
| 4,756,596 | 7/1988 | Ona et al. | 350/96.23 |
| 4,909,592 | 3/1990 | Arroyo et al. | 350/96.23 |
| 4,952,012 | 8/1990 | Stamnitz | 350/96.23 |
| 4,976,509 | 12/1990 | Bachmann et al. | 350/96.23 |
| 4,993,805 | 2/1991 | Abe et al. | 350/96.23 |

Primary Examiner—William L. Sikes
Assistant Examiner—Robert E. Wise
Attorney, Agent, or Firm—William L. Botjer

[57] ABSTRACT

The invention relates to an electrical overhead cable rope comprising an integrated optical communication lead (13), in which metallic wire elements (14, 15, 16) surround a tube (1) or noble steel, in which at least one optical waveguide (2) is contained. Corrosion of the wire elements of the overhead cable rope is prevented by providing a tube (1) of noble steel having applied to it a water-tight coating which establishes a continuous electrically conducting connection between the tube of noble steel and the wire elements (14, 15, 16) surrounding it.

13 Claims, 1 Drawing Sheet

ELECTRICAL OVERHEAD CABLE ROPE COMPRISING AN INTEGRATED OPTICAL COMMUNICATION LEAD

FIELD OF THE INVENTION

The invention relates to an electrical overhead cable rope comprising an integrated optical communication lead, in which metallic wire elements surround a tube of noble steel, in which at least one optical waveguide is contained.

BACKGROUND OF THE INVENTION

In such an arrangement known from EP-A 286804, instead of one of the wire elements consisting of aluminum or an alloy of aluminum, a tube of noble steel containing the optical waveguides is stranded in. The tube of noble steel is free of corrosion due to the constituent material so that the optical waveguides contained therein are permanently enclosed in an airtight manner and are protected from penetration of water. On account of the high mechanical strength of the tube of noble steel in spite of the small wall thickness, the loose optical waveguides extending therein with excess length are also protected from detrimental mechanical effects.

However, it has been found that wire elements of the overhead cable rope consisting of less noble material, such as particularly aluminum, are attacked by corrosion due to the tube of noble steel contacting these elements.

SUMMARY OF THE INVENTION

An object of the invention is to avoid corrosion of the wire elements of an overhead cable rope of the kind mentioned in the opening paragraph i.e. a cable rope comprising an integrated optical communication lead in which metallic wire elements surround the tube of noble steel, in which at least one optical waveguide is contained.

This object is achieved by providing a tube of noble steel which has applied to it a coating which is watertight and which establishes a continuous electrically conducting connection between the tube of noble steel and the wire elements surrounding it.

Because of the water-tightness of the coating, no electrolytic path can be formed from the wire elements to the tube of noble steel. The less noble material of the coating does not cause an inadmissibly high corrosion of the engaging wire elements.

A coating of synthetic material on the tubes of noble steel provides a suitable solution only if additional steps have been taken, by which a continuous electrical contacting of the tube of noble steel with the adjacent wire elements of the overhead cable rope is ensured, for example by incorporation of metallic particles of a material less noble in comparison with noble steel. Without such a contacting, with flashes of lightning striking the overhead cable rope high potential differences could occur between the wire elements and the tube of noble steel, which would lead to punctures or perforations of the layer of synthetic material or even to damage of the tube of noble steel.

In a preferred embodiment, the coating consists of a metal which is arranged in the electro-chemical series between the materials of the wire elements and of the tube of noble steel. With a metal layer, both water-tightness and electrical contacting can be realized particularly successfully. For the coating a metal is particularly suitable which in the electrochemical series lies more closely to the material of the wire elements than to the material of the tube of noble steel.

In a particularly preferred embodiment the tube of noble steel is zinc-plated.

Additionally, in an embodiment that can be obtained in a particularly simple manner, the tube of noble steel is fully enclosed by a system of tapes arranged with overlap, whose overlapping parts are stuck together more particularly by means of melting adhesive. By sticking the overlapping parts together, the penetration of water is prevented.

Preferably, for the system of tapes the same material is chosen as that of which the wire elements are made.

The metal tape can be applied in a very simple manner if it is folded around the tube of noble steel in the longitudinal direction.

Damage of the thin-layer metal tape, such as for example tearing in, is prevented in that it is adhered to the surface of the tube of noble steel. The electrical contacting with the tube of noble steel must not be prevented by the adhesive. Therefore, the adhesive may be conducting. However, it is preferred that the metal tape be arranged to surround the tube of noble steel in the longitudinal direction and adhered to its surface in such a manner that contact zones free of adhesive are left between the tube of noble steel and the metal tape and in which plastically deformed parts of the metal tape are pressed against the surface of the tube of noble steel.

The parts of the metal tape free of adhesive are preferably pressed plastically against the tube of noble steel by the pressure applied during the heating of the melting adhesive. An embodiment in which a high degree of water-tightness is attained without overlapping areas is characterized in that two metal tapes are each time folded around the tube of noble steel without overlap in such a manner that the separation joints of the tapes are arranged approximately diametrically opposite to each other and the first metal tape is contacted in an electrically conducting manner with the tube of noble steel and the second metal tape is contacted in an electrically conducting manner with the first metal tape.

The contact zones free of adhesive are preferably located as remotely as possible, at least 180° from the external overlap end of the metal tape in order that the moisture attacking from the outside has to pass through a longest possible adhesive path. For the same reason, it is preferred that the contact zones free of adhesive be arranged in a strip-shaped part of the metal tape, which extends over an angular range of less than 90°. A comparatively narrow strip-shaped part means that large widths are left for the sections continuously stuck together.

In order that the metal tape also firmly adheres to the tube of noble steel at the area of the contacting strips, it is ensured that melting adhesive is applied in the form of a grating at the area of the strips.

BRIEF DESCRIPTION OF THE DRAWINGS

In order that the invention may be readily carried out, it will now be described more fully, by way of example, with reference to the accompanying drawing, in which.

Figure 1:
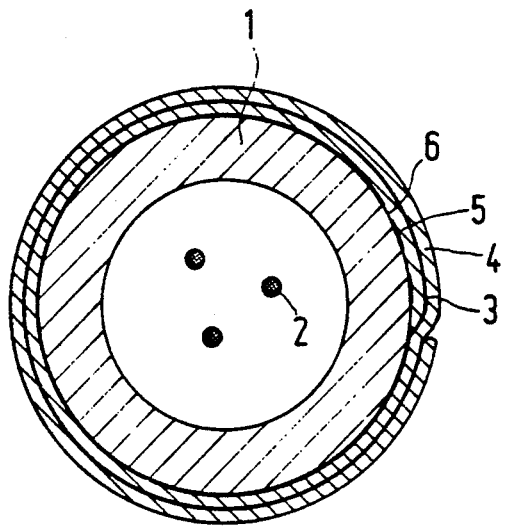
FIG. 1 shows a cross-section of a first embodiment of a communication lead provided with a coating according to the invention.
Figure 2:
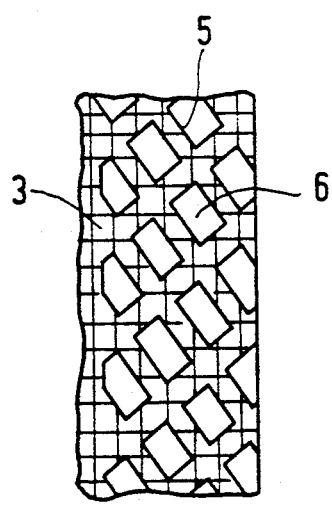
FIG. 2 shows a cut-out part of the metal tape used for the coating of the embodiment shown in FIG. 1.

According to FIG. 1, in a seam-welded tube 1 of noble steel (wall thickness about 0.1 to 0.2 mm) three optical waveguides 2 extend with excess length. Around the tube 1 of noble steel is folded an aluminum tape 4 coated with an about 10 μm thick layer 3 of melting adhesive and having a thickness of about 0.1 mm with an overlapping width of about 360°. A contacting strip extending at an end edge of the aluminum tape 4 through a circumferential angle of about 30° is provided in the form of a grating with adhesive strips 5, between which are located parts 6 free of adhesive each of about 5 mm$^2$, as can be seen more clearly in FIG. 2.

During adhesion, the layer 3 of melting adhesive and the adhesive strips 5 are heated. At the same time, a radial pressure is applied by means of a draw plate, through whose bore the coated tube 1 of noble steel is drawn. Due to this pressure, the parts 6 of the aluminum tape 4 are permanently pressed against the surface of the tube 1 of noble steel by plastic deformation, as a result of which an electrical contact is obtained throughout the length of the communication lead.

It is also possible to form embossed parts 6, for example by a stamping operation, on the aluminum strip before the folding operation. A grating structure according to FIG. 2 may also be obtained in modified form, for example by transverse strips of melting adhesive succeeding each other in the form of a ladder.

Figure 3:
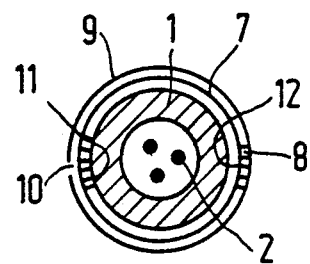
FIG. 3 shows diagrammatically a cross-section of a second embodiment of a communication lead provided with a coating according to the invention.

In FIG. 3, a first metal strip 7 is adhered to the tube 1 of noble steel without overlap with a separation joint 8, a contact strip 11 being located, as in the embodiment of FIG. 1, diametrically opposite to the separation joint 8.

The electrical contacting of the tube 1 of noble steel with the metal strip 7 occurs at this location. A second metal strip 9 offset with respect to the first similar metal strip 7 by 180° is adhered without overlap with a separation joint 10. A contact strip 12 ensures the electrical contacting of the two tapes 7 and 9.

The coatings applied in accordance with the invention and consisting of very thin metal tapes 3 and 7 and 9, respectively, are mechanically resistant on account of the adhesion. If nevertheless a hole should be formed in the coating, penetration of water cannot lead to destruction of the tube 1 of noble steel because this tube is resistant to corrosion due to the constituent material. At any rate the engaging coating can corrode, but the wire elements cannot corrode because the electrolytic path to the surrounding less noble wire elements is too long.

Figure 4:
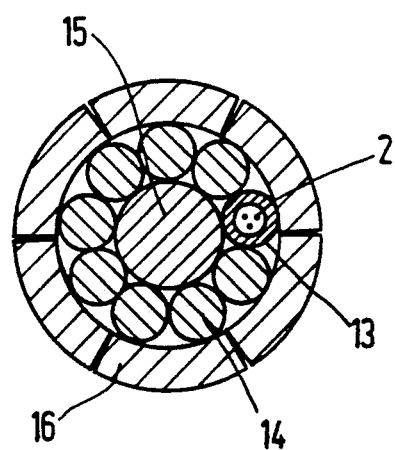
FIG. 4 shows the arrangement of a communication lead provided with a coating according to the invention in an overhead cable rope.

In FIG. 4, a communication lead 13 constructed as shown in FIG. 1 or FIG. 3 is stranded with overhead lead wires 14 resistant to tensile stress around a core 15 resistant to tensile stress. The layer wound around it in opposite sense is constituted by profiled wire elements 16 of aluminum, which also have a circular cross-section.

We claim:

1. An electrical overhead cable rope comprising an integrated optical communication lead (13), in which metallic wire elements (14, 15, 16) surround a tube (1) of noble steel, in which at least one optical waveguide (2) is contained, wherein the tube (1) of noble steel has applied to it a water-tight coating establishing a continuous electrically conducting connection between the tube of noble steel and the wire elements (14, 15, 16) surrounding this tube.

2. An overhead cable rope as claimed in claim 1, wherein the tube (1) of noble steel is coated with a continuous layer of synthetic material, which contains electrically conducting components.

3. An overhead cable rope as claimed in claim 1, wherein the coating (3, 7, 9) consists of a metal, which is arranged in the electrochemical series between the materials of the wire elements (14, 15, 16) and of the tube of noble steel.

4. An overhead cable rope as claimed in claim 3, wherein the metal of the coating (3, 7, 9) lies in the electrochemical series more closely to the material of the Wire elements (14, 15, 16) than the material of the tube (1) of noble steel.

5. An overhead cable rope as claimed in claim 3 wherein the tube (1) of noble steel is zinc-plated.

6. An overhead cable rope as claimed in claim 3 wherein the tube (1) of noble steel is fully surrounded by a system of tapes (3, 7, 9), which is arranged with overlap and whose overlapping parts are stuck together more particularly by means of melting adhesive (3).

7. An overhead cable rope as claimed in claim 6, wherein the system of tapes (3, 7, 9) consists of metal, more particularly of the same metal as the wire elements (16).

8. An overhead cable rope as claimed in claim 6 wherein the metal tape (3, 7, 9) is folded around the tube (1) of noble steel in the longitudinal direction and is adhered to its surface by means of an electrically conducting adhesive.

9. An overhead cable rope as claimed in claim 6 wherein the metal tape (3, 7, 9) is arranged to surround the tube of noble steel in the longitudinal direction and is adhered to its surface in such a manner that contact zones (6) free of adhesive are left between the tube (1) of noble steel and the metal tape (3, 7, 9), in which plastically deformed parts of the metal tape (3, 7, 9) are pressed against the surface of the tube (1) of noble steel.

10. An overhead cable rope as claimed in claim 9 wherein the contact zones (6) free of adhesive are located at least 180° from the external overlap end of the metal tape (3, 7, 9).

11. An overhead cable rope as claimed in claim 9 wherein the contact zones (6) free of adhesive are arranged in a strip-shaped part of the metal tape (3, 7, 9), which extends over an angular range of less than 90°.

12. An overhead cable rope as claimed in claim 11, wherein melting adhesive is applied in the form of a grating (5) in the strip-shaped part.

13. An overhead cable rope as claimed in claim 3 wherein two metal tapes (7, 9) are folded each time without overlap around the tube (1) of noble steel in such a manner that the separation joints (8 and 10, respectively) of the tapes are arranged approximately diametrically opposite to each other and in, the first metal tape (7) is contacted in an electrically conducting manner with the tube (1) of noble steel, and the second metal tape (9) is contacted in an electrically conducting manner with the first metal tape (7).

* * * * *